(12) United States Patent
Son

(10) Patent No.: US 12,051,787 B2
(45) Date of Patent: Jul. 30, 2024

(54) APPARATUS FOR CHARGING AND DISCHARGING SECONDARY BATTERY

(71) Applicant: LG ENERGY SOLUTION, LTD., Seoul (KR)

(72) Inventor: Jae-Hyoung Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 38 days.

(21) Appl. No.: 17/630,571

(22) PCT Filed: May 12, 2020

(86) PCT No.: PCT/KR2020/006227
§ 371 (c)(1),
(2) Date: Jan. 27, 2022

(87) PCT Pub. No.: WO2021/040188
PCT Pub. Date: Mar. 4, 2021

(65) Prior Publication Data
US 2022/0263143 A1 Aug. 18, 2022

(30) Foreign Application Priority Data

Aug. 30, 2019 (KR) .................. 10-2019-0107342

(51) Int. Cl.
*H01M 10/42* (2006.01)
*H01M 10/04* (2006.01)
(Continued)

(52) U.S. Cl.
CPC ... *H01M 10/4285* (2013.01); *H01M 10/0404* (2013.01); *H01M 10/0481* (2013.01); *H01M 50/105* (2021.01); *H02J 7/0069* (2020.01)

(58) Field of Classification Search
CPC ........... H01M 10/4285; H01M 10/441; H01M 10/46; H01M 10/0404; H01M 10/0481;
(Continued)

(56) References Cited

U.S. PATENT DOCUMENTS

2006/0200972 A1  9/2006  Onishi et al.
2012/0071040 A1  3/2012  Park et al.
(Continued)

FOREIGN PATENT DOCUMENTS

CA    2 279 152 A1    2/2000
CN    101919085 A    12/2010
(Continued)

OTHER PUBLICATIONS

International Search Report (PCT/ISA/210) issued in PCT/KR2020/006227 mailed on Aug. 27, 2020.
(Continued)

*Primary Examiner* — Raymond Alejandro
(74) *Attorney, Agent, or Firm* — Birch, Stewart, Kolasch & Birch, LLP

(57) ABSTRACT

An apparatus includes a plurality of press plates arranged opposite each other with a cell insertion space therebetween into which a battery cell is insertable, and the plurality of press plates being movable towards each other to press a body of the battery cell, at least one gripper unit mounted on an upper edge of each press plate of the plurality of press plates, the at least one gripper unit extending to the cell insertion space, and the at least one gripper unit coming into contact with an electrode lead of the battery cell when adjacent press plates press the body of the battery cell, and at least one push bar unit coupled with the at least one gripper unit, the at least one push bar unit extending to the cell insertion space and including a push bar pressing portion to elastically press a terrace area of the battery cell.

11 Claims, 17 Drawing Sheets

(51) Int. Cl.
　　*H01M 50/105*　　(2021.01)
　　*H02J 7/00*　　(2006.01)

(58) Field of Classification Search
　　CPC . H01M 10/0486; H01M 50/105; H02J 7/0069
　　See application file for complete search history.

(56) References Cited

U.S. PATENT DOCUMENTS

| | | |
|---|---|---|
| 2016/0172636 A1 | 6/2016 | Okahata |
| 2018/0191023 A1 | 7/2018 | Cao et al. |
| 2018/0269699 A1* | 9/2018 | Yoon .................... H02J 7/0045 |
| 2019/0222033 A1* | 7/2019 | Zhao .................... H02J 7/0045 |

FOREIGN PATENT DOCUMENTS

| | | |
|---|---|---|
| CN | 103811817 A | 5/2014 |
| CN | 105826985 A | 8/2016 |
| CN | 107248593 A | 10/2017 |
| CN | 107710449 A | 2/2018 |
| CN | 207269044 U | 4/2018 |
| CN | 207474603 U | 6/2018 |
| JP | 2018-529182 A | 10/2018 |
| JP | 2018-185949 A | 11/2018 |
| KR | 2006-252831 A | 9/2008 |
| KR | 10-2011-0137741 A | 12/2011 |
| KR | 19-2011-0139071 A | 12/2011 |
| KR | 10-2015-0050220 A | 5/2015 |
| KR | 10-2015-0050223 A | 5/2015 |
| KR | 10-2016-0004661 A | 1/2016 |
| KR | 10-2016-0027193 A | 3/2016 |
| KR | 10-2017-0061622 A | 6/2017 |
| KR | 10-2017-0068145 A | 6/2017 |
| KR | 10-2018-0038181 A | 4/2018 |
| KR | 10-2019-0072289 A | 6/2019 |

OTHER PUBLICATIONS

Extended European Search Report for European Patent Application No. 20859035.6, dated Nov. 30, 2022.

Li, "Research on Internal Temperature Characteristics of Apparent Resistivity and Safety Status Monitoring for Power Battery Based on ERT," China Excellent Master's Thesis Full Text Database (Engineering Science and Technology, Series II), Apr. 30, 2015, pp. 61-71, with English translation.

* cited by examiner

APPARATUS FOR CHARGING AND DISCHARGING SECONDARY BATTERY

TECHNICAL FIELD

The present disclosure relates to an apparatus for charging and discharging a secondary battery, and more particularly, to an apparatus for charging and discharging a secondary battery for significantly reducing the defect rate caused by swelling of a secondary battery cell at a terrace area in the activation process of the secondary battery.

The present application claims the benefit of Korean Patent Application No. 10-2019-0107342 filed on Aug. 30, 2019 with the Korean Intellectual Property Office, the disclosure of which is incorporated herein by reference in its entirety.

BACKGROUND ART

In general, secondary batteries may be classified into cylindrical, prismatic and pouch-type secondary batteries according to the shape. Among them, the pouch-type secondary battery includes a pouch case made from a multi-layered film including a metal layer (foil) and a synthetic resin layer coated on the upper and lower surfaces of the metal layer, and the pouch case forms the outer shape of the pouch-type secondary battery. Compared to the cylindrical or prismatic secondary battery using a metal can, the pouch-type secondary battery is much lighter, leading to a significant reduction in the weight of the battery, and can be changed in various shapes. Due to these advantages, much attention is paid to the pouch-type secondary battery.

The pouch-type secondary battery includes an electrode assembly in a stacked form. In the electrode assembly, electrode leads are connected to electrode tabs and extend out of the pouch case. The electrode leads are electrically connected in contact with an external device to receive power from the external device.

The pouch-type secondary battery is manufactured by a cell assembly process and a battery activation process. In the battery activation step, the secondary battery cell is mounted on a charger/discharger, and charging and discharging is performed under the conditions necessary for activation. For the activation of the battery, charging and discharging is performed repeatedly many times, and this process is referred to as a formation process.

The conventional apparatus for charging and discharging a secondary battery used in the formation process includes press plates to press the secondary battery and a charge/discharge gripper connected to the electrode leads of the secondary battery cells to apply the current/voltage.

The press plate presses the secondary battery cell to prevent an increase in the thickness of the secondary battery cell due to gas generation during charging and discharging. The pouch-type secondary battery cell before the formation process generally has a larger pouch size than the pouch size of the final product in order to capture gas generated during charging and discharging. The extra portion for capturing gas is commonly referred to as a gas pocket in the corresponding technical field. The gas pocket is cut off after the activation process.

There are some problems raised when performing the formation process using the conventional apparatus for charging and discharging a secondary battery, and among them, the following ones are related to the yield and production efficiency and urgently need to be solved.

First, the secondary battery cell swells at the terrace 2b and an adhesive layer inside the pouch is broken, causing an insulation voltage failure (see FIG. 1). During charging and discharging, a body 2a of the secondary battery cell is pressed by the press plates, while the thin terrace area (heat-sealed portion) of the cell is not pressed, resulting in the increased internal pressure of the pouch. The yield is notably influenced by the defect rate caused by the breakage of the adhesive layer at the terrace area of the secondary battery cell. Accordingly, it is necessary to prevent the damage of the terrace area of the secondary battery cell.

Second, tens of secondary battery cells are picked up and placed in the spaces between the press plates from top to bottom at once using transfer equipment in the production line, and in this process, when there is even a little bit error in the entry position of the secondary battery cells, the secondary battery cells touch the top of the press plate and cannot smoothly enter, and accordingly there is an need for an approach to improve the efficiency of the corresponding process and prevent the cell damage.

DISCLOSURE

Technical Problem

The present disclosure is designed to address the above-described problems, and therefore the present disclosure is directed to providing an apparatus for charging and discharging a secondary battery for preventing a secondary battery cell from swelling at a terrace area during charging and discharging.

However, the technical problem to be solved by the present disclosure is not limited to the above-described problems, and other problems not mentioned herein will be clearly understood by those skilled in the art from the following description.

Technical Solution

To solve the above-described problem, according to the present disclosure, there is provided an apparatus for charging and discharging a secondary battery cell, including a plurality of press plates arranged opposite each other with a cell insertion space interposed therebetween into which the secondary battery cell is insertable, and the plurality of press plates being movable toward each other to press a body of the secondary battery cell, at least one gripper unit mounted on an upper edge of each press plate of the plurality of press plates, the at least one gripper unit extending to the cell insertion space, and the at least one gripper unit being configured to come into contact with an electrode lead of the secondary battery cell when adjacent press plates of the plurality of press plates press the body of the secondary battery cell, and at least one push bar unit coupled with the at least one gripper unit, the at least one push bar unit extending to the cell insertion space and including a push bar pressing portion configured to elastically press a terrace area of the secondary battery cell.

The at least one push bar unit may further include a push bar head disposed on top of the press plate, and the push bar pressing portion may be provided in a plate shape having a width corresponding to a width of the terrace area of the secondary battery and extending to the cell insertion space on one side of the push bar head.

The push bar head may have a step on one side, and the push bar pressing portion may be connected to the one side of the push bar head to allow elastic movement of the push bar pressing portion within a depth of the step.

The push bar pressing portion may have a mounting hole formed in a thickness direction at an upper end of the push bar, and the push bar pressing portion may be connected to the push bar head by a fastening member, the fastening member may include a first part that is located inside the mounting hole, a second part that has a smaller diameter than the first part, the second part may pass through the mounting hole, and a third part that has a smaller diameter than the second part and is screwed to one side of the push bar head. A spring may surround the second part.

The at least one push bar unit may further include a silicone pad attached to a surface of the push bar pressing portion.

The apparatus may further include a slip sheet in a shape of a sheet having at least a portion disposed in the cell insertion space and configured to support the secondary battery cell, and a slip sheet holder that is configured to be attached and detached to/from the a top of each of the adjacent press plates with the slip sheet interposed between the slip sheet holder and the adjacent press plates.

The apparatus may further include at least one cell entry guide extending upright along the slip sheet holder and including a guide shape portion having a sloping or curved shape facing the cell insertion space.

The cell entry guide may further include an elastic support portion to support the guide shape portion in which the elastic support portion may be a spring or bellows structure below the guide shape portion.

The cell entry guide may further include a guide mounting portion provided below the elastic support portion, and the guide mounting portion may be mounted on the slip sheet holder and may be slidably moveable along a longitudinal direction of the slip sheet holder.

The slip sheet holder may have positioning grooves that are recessed at predetermined positions on an upper surface of the slip sheet holder along the longitudinal direction, and the guide mounting portion may have a ball plunger, the ball plunger being fitted into any one of the positioning grooves.

As another example, the cell entry guide may further include a balance portion configured to define a center of mass below the guide shape portion in which the balance portion has a curved lower surface, and a guide mounting portion that receives the balance portion and has an inner receiving groove configured to allow the balance portion to rotate within a predetermined range.

Advantageous Effects

According to the apparatus for charging and discharging a secondary battery in accordance with the present disclosure, it is possible to reduce the defect rate caused by swelling of the secondary battery cell at the terrace area in the charging and discharging process for activation of the secondary battery cell, thereby improving the yield.

In addition, according to another aspect of the present disclosure, when inserting the secondary battery cells into the spaces between the press plates of the apparatus for charging and discharging a secondary battery, the secondary battery cells are guided by the cell entry guide, thereby preventing the cell damage and improving the efficiency of the insertion process.

DETAILED DESCRIPTION

Figure 1:
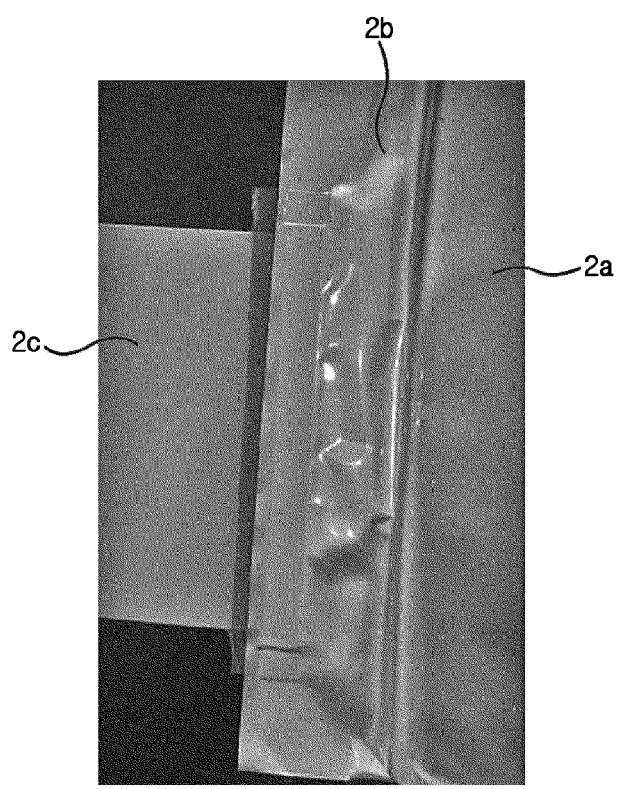
FIG. 1 is a diagram showing a terrace area of a conventional pouch-type secondary battery cell after a formation process.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation. Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

An apparatus for charging and discharging a secondary battery according to the present disclosure as described below is configured to charge and discharge a secondary battery cell 2 to activate the secondary battery cell 2 in an inactive state after assembled. The apparatus for charging and discharging a secondary battery is mainly used not only to activate the secondary battery cell 2, but also to test the performance of the secondary battery cell 2, for example, to determine if the cell is short-circuited. A terrace area 2b of the secondary battery cell 2 is a heat-sealed edge of a pouch case, and in particular, where an electrode lead 2c extends out of the pouch case.

Figure 2:
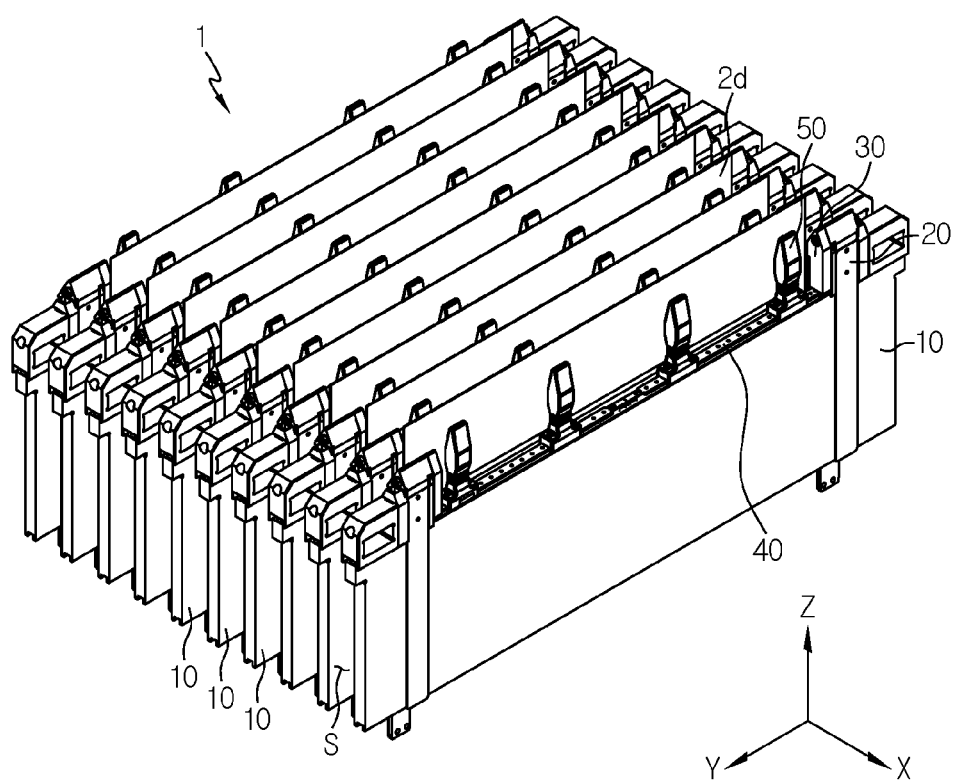
FIG. 2 is a schematic perspective view of an apparatus for charging and discharging a secondary battery according to an embodiment of the present disclosure.
Figure 3:
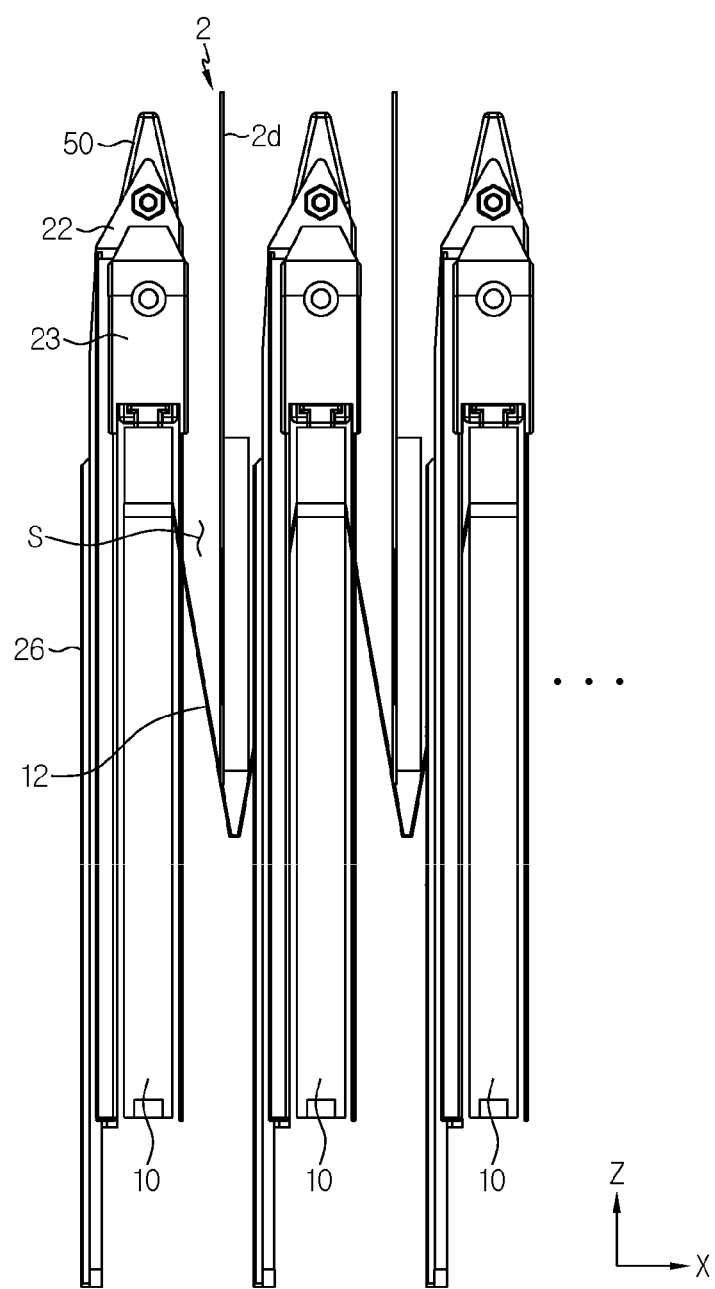
FIG. 3 is a diagram of the apparatus for charging and discharging a secondary battery of FIG. 2 when viewed from the side (±Y axis).
Figure 4:
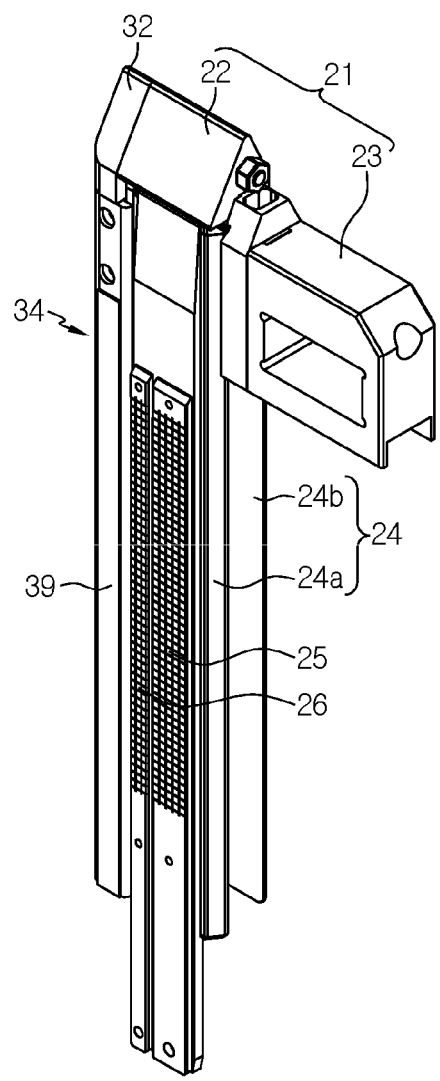
FIG. 4 is an assembled perspective view of a gripper unit and a push bar unit of FIG. 2.

FIG. 2 is a schematic perspective view of the apparatus for charging and discharging a secondary battery according to an embodiment of the present disclosure, FIG. 3 is a diagram of the apparatus for charging and discharging a secondary battery of FIG. 2 when viewed from the side (±Y axis), and FIG. 4 is an assembled perspective view of a gripper unit 20 and a push bar unit 30 of FIG. 2.

As shown in the drawings, the apparatus for charging and discharging a secondary battery according to an embodiment of the present disclosure may include a plurality of press plates 10, a gripper unit 20, and a push bar unit 30.

The secondary battery cell 2 may swell due to swelling of a positive electrode plate and a negative electrode plate or gas generation during charging and discharging. The press plate 10 serves to prevent swelling by pressing the secondary battery cell 2 during charging and discharging.

The plurality of press plates 10 arranged facing each other, spaced apart a predetermined distance, and their spacing is increased or decreased by movement of the press plates 10 (in the direction of ±X-axis). That is, the secondary battery cell 2 is inserted into the spacing and pressed by adjusting the spacing between the press plates 10. Hereinafter, the spacing will be defined as a cell insertion space S.

The secondary battery cells 2 in an inactive state have gas pockets 2d, and may be delivered at once by a pickup device (not shown) and placed in each cell insertion space S downward from the top of the apparatus for charging and discharging a secondary battery. In this instance, a slip sheet 12 is used to support the secondary battery cell 2 at a predetermined height.

The slip sheet 12 is a flexible sheet material, a portion of the slip sheet 12 is fixed to the upper part of the press plate 10 by a slip sheet holder 40 as described below, and the slip sheet 12 is folded in the middle between the fixed parts and placed in each cell insertion space S. The slip sheet 12 serves to prevent the direct contact between the body 2a of the secondary battery cell 2 and the press plate 10 to protect the surface of the body 2a of the cell 2.

The press plate 10 may be preferably made of a metal material having high mechanical strength to provide the resistance to high heat and pressure. Of course, the scope of the present disclosure is not limited to the metal plate 10 made of metal. For example, the press plate 10 may be made of stainless steel, reinforced plastics, reinforced ceramics or reinforced glass.

Although not shown for convenience of illustration, the press plates 10 may be connected for their translation along a shaft extending in the X-axis direction below the press plates 10, gears may be connected to one end of the shaft, and a motor may be connected to the gears. In addition, any mechanical combination may be employed as long as it is a mechanical combination having an operating mechanism for moving the press plates 10 to press the secondary battery cell 2.

The gripper unit 20 includes a current terminal 25 and a voltage terminal 26 on one side, and the current terminal 25 and the voltage terminal 26 come into contact with the electrode lead 2c of the secondary battery cell 2 to supply power to the secondary battery cell 2 and absorb power from the secondary battery cell 2. When the body 2a of the secondary battery cell 2 is pressed between two press plates 10, the electrode lead 2c of the secondary battery cell 2 is pressed between the two gripper units 20 while one surface comes into contact with the current terminal 25 and the voltage terminal 26, thereby stably maintaining the electrical connection.

The gripper unit 20 is mounted on the upper edge of the press plate 10 for each press plate 10 and a portion of the gripper unit 20 extends to a location at which the electrode lead 2c will be disposed in the cell insertion space S. In this embodiment, each gripper unit 20 is mounted on each of two upper edges of the press plate 10, and this is an example of design corresponding to the secondary battery cell 2 having the bidirectional electrode lead 2c. In the case of the secondary battery cell 2 having the unidirectional positive/negative electrode lead 2c, the number of gripper units 20 and the position of the gripper unit 20 may be different.

Specifically, referring to FIG. 4, the gripper unit 20 includes a gripper head 21 disposed on top of the press plate 10, and a gripper pressing portion 24 extending downward from the gripper head 21.

The gripper pressing portion 24 includes two plates 24a, 24b each extending down from the top of the press plate 10 on each of two sides. Preferably, the width of the two plates 24a and 24b corresponds to the width of the electrode lead 2c. In addition, the current terminal 25 and the voltage terminal 26 are mounted on one of the two plates 24a and 24b. The current terminal 25 and the voltage terminal 26 may be formed in the shape of a metal rod, and a cable (not shown) for supplying the current may be connected below the current terminal 25 and the voltage terminal 26. The current terminal 25 and the voltage terminal 26 are mounted in parallel to each other on one surface of the gripper pressuring portion 24, and come into contact with the electrode lead 2c when the press plates 10 press the body 2a of the secondary battery cell 2.

The gripper head 21 may include a block member 23 that supports the gripper pressing portion 24 and is provided slidably along the top line of the press plate 10, and a cap member 22 disposed on the gripper pressing portion 24.

The block member 23 may be disposed on the top of the press plate 10 and mounted on the press plate 10 while partially wrapping two sides, and may slidably move to the left and right (±Y-axis direction) along the top of the press plate 10.

The cap member 22 may be provided in an upward tapered shape. The shape of the cap member may be advantageous for the cell body 2a or the electrode lead 2c to smoothly move into the cell insertion space S when the secondary battery cells 2 go in between the press plates 10.

The push bar unit 30 is coupled adjacent to the gripper unit 20. The push bar unit 30 serves to press the terrace area 2b of the secondary battery cell 2 that cannot be pressed by the press plate 10, to prevent the swelling of the secondary battery cell 2 at the terrace area 2b during charging and discharging.

Figure 5:
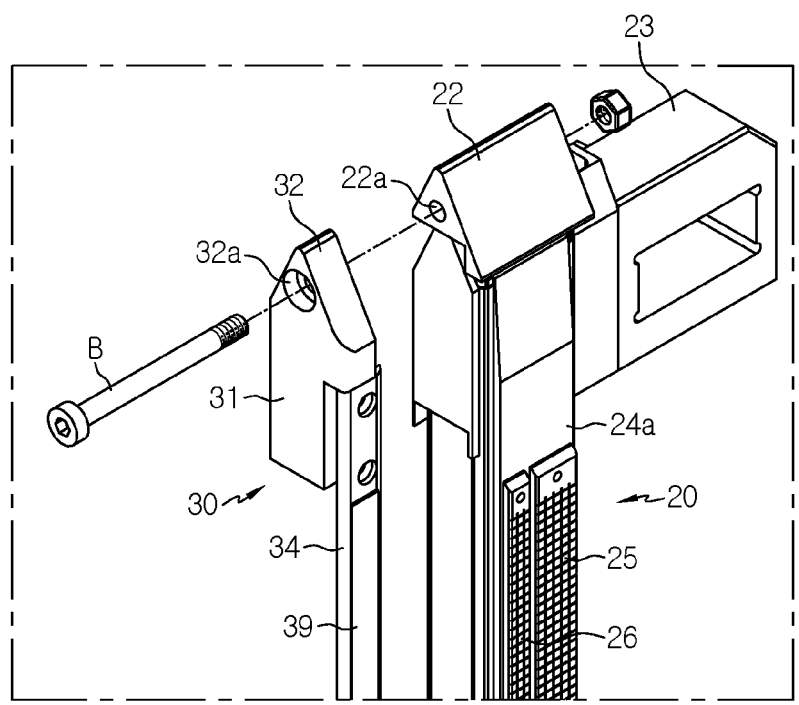
FIG. 5 is an exploded perspective view of FIG. 4.
Figure 6:
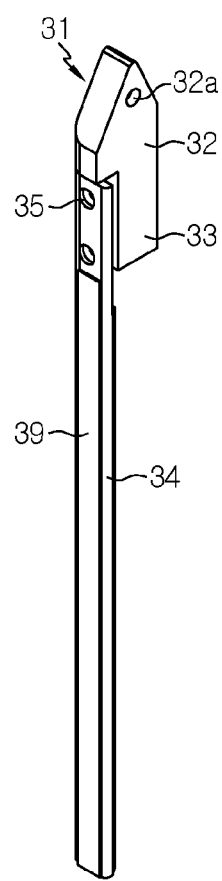
FIG. 6 is a perspective view of the push bar unit of FIG. 4.

Specifically, referring to FIGS. 5 and 6, the push bar unit 30 may include a push bar head 31 connected to the gripper head 21 and disposed on the top of the press plate 10, and a push bar pressing portion 34 extending from the push bar head 31 to the cell insertion space S.

The push bar head 31 has a step on one side, and may be divided into an upper part 32 and a lower part 33 with respect to the step. In the similar way to the cap member 22 of the gripper head 21 described above, the upper part 32 may be provided in an upward tapered shape.

The upper part 32 of the push bar head 31 and the cap member 22 of the gripper head 21 include bolt through-holes 32a, 22a, respectively. As shown in FIG. 5, the push bar head 31 and the gripper head 21 are in contact with each other, and a bolt B is inserted into the bolt through-holes 32a, 22a and tightened with a nut to couple the push bar unit 30 and the gripper unit 20.

The push bar pressing portion 34 is coupled to one side of the lower part 33 to allow elastic movement within the step range of the push bar head 31.

Figure 7:
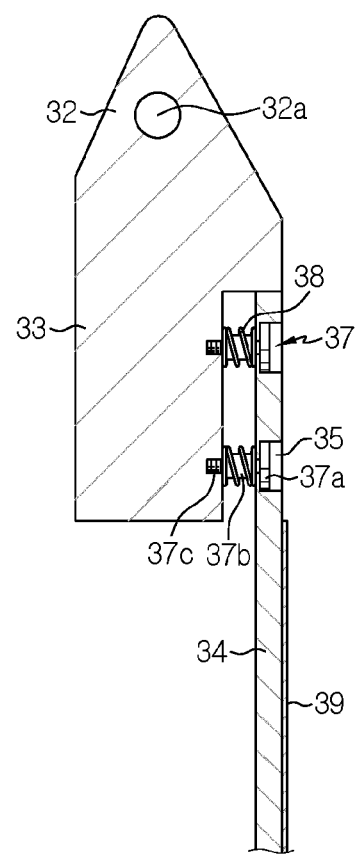
FIG. 7 is a schematic longitudinal cross-sectional view of the push bar unit of FIG. 6.

For example, as shown in FIG. 7, the push bar pressing portion 34 has two mounting holes 35 at the upper end, and may be connected to the lower part 33 of the push bar head 31 by a fastening member 37 passing through the mounting holes 35.

The fastening member 37 may include a first part 37a having the largest diameter, a second part 37b having the second largest diameter, and a third part 37c having the smallest diameter. The mounting hole 35 may be formed in the thickness direction of the push bar pressing portion 34, and have different diameters on one side and the other side.

The first part 37a of the fastening member 37 has a diameter at which the first part 37a can be inserted into one side of the mounting hole 35 but cannot escape from the other side. In addition, the second part 37b and the third part 37c have diameters passing through one side and the other side of the mounting hole 35. The fastening member 37 is inserted into the mounting hole 35, a spring 38 is inserted into the second part 37b and the third part 37c, and the third part 37c is screw coupled to the lower part 33 of the bar push head 31. In this instance, different diameters of the second part 37b and the third part 37c limit the depth to which the screw is fastened. It is useful for accurately securing a space in which the push bar pressing portion 34 can move relative to the push bar head 31.

With this configuration, the push bar pressing portion 34 may make an elastic movement within the step range of the push bar head 31.

The push bar pressing portion 34 may be formed in the shape of a plate having a width T and a length corresponding to the cell terrace 2b, and its material may be epoxy when considering that the push bar pressing portion 34 comes into direct contact with the cell terrace 2b. Of course, the scope of the present disclosure is not limited to the push bar pressing portion 34 of epoxy. For example, the push bar pressing portion 34 may be any material having the insulating property, the heat resistance and the mechanical strength.

Additionally, a silicone pad 39 may be attached to the surface of the push bar pressing portion 34. The silicone pad 39 may effectively shock absorb when the cell terrace 2b is pressed and improve the adhesion.

Figure 8:
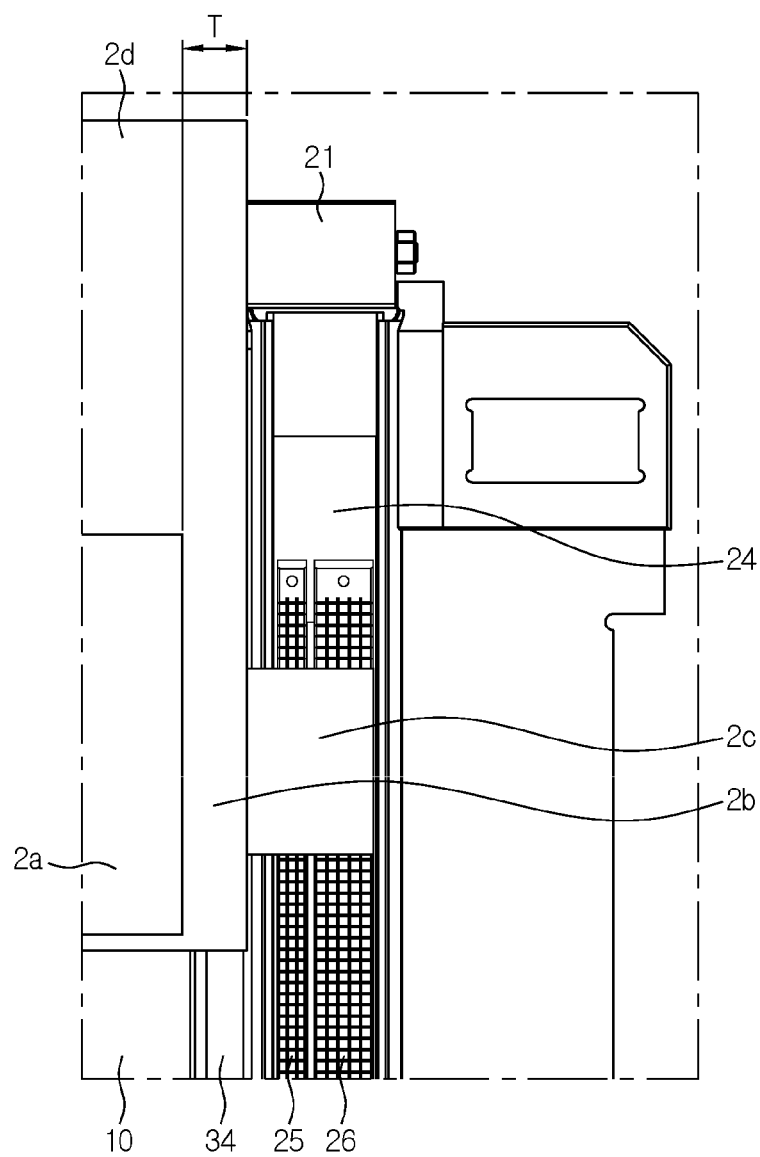
FIG. 8 is a diagram showing the pressing and contact structure of a secondary battery cell, a gripper unit, and a push bar unit in an apparatus for charging and discharging a secondary battery according to an embodiment of the present disclosure.
Figure 9:
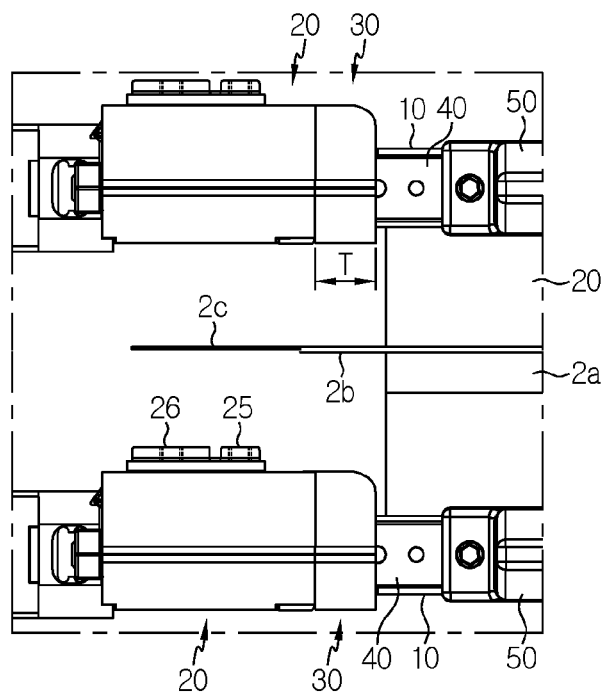
FIGS. 9 and 10 are plane views of the main parts of an apparatus for charging and discharging a secondary battery before and after charging and discharging, respectively.
Figure 10:
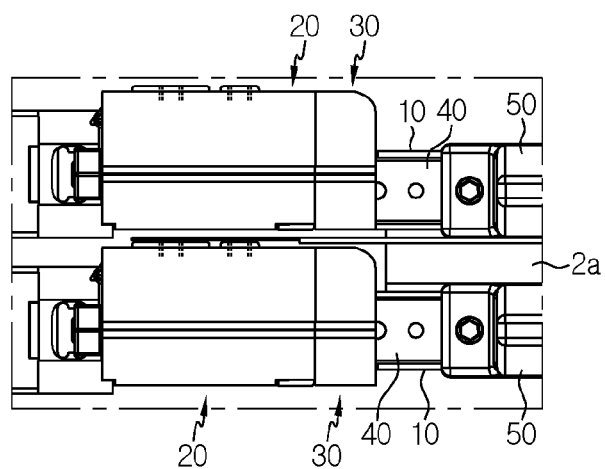

Hereinafter, the operating mechanism of the apparatus for charging and discharging a secondary battery according to the present disclosure will be briefly described with reference to FIGS. 8 to 10.

First, secondary battery cells 2 to be activated are loaded between the specified press plates 10 using the cell pickup device (not shown), and the position of the gripper unit 20 and the push bar unit 30 is adjusted to conform to the length of the secondary battery cell 2. In this instance, since the gripper unit 20 and the push bar unit 30 are mounted on top of the press plate 10 and move together, and when the push bar unit 30 is placed at a location corresponding to the cell terrace 2b, the gripper unit 20 is positioned at a location corresponding to the electrode lead 2c.

Subsequently, the motor is operated to reduce the spacing between the press plates 10 so as to press the cell body 2a of the secondary battery cell 2. In this instance, the electrode lead 2c of the secondary battery cell 2 may be pressed by two adjacent gripper pressing portions 24.

As described above, the gripper pressing portion 24 includes the two plates 24a, 24b each extending in parallel from the press plate 10 on each of the two sides, and the two plates 24a, 24b to which the current/voltage terminal 26 is attached elastically support the current/voltage terminal 26. According to this configuration, the decreasing spacing between the press plates 10 in contact between the current/voltage terminal 26 of the gripper pressing portion 24 and the electrode lead 2c, the current/voltage terminal 26 is pushed against in the opposite direction to the pressing direction. The contact between the current/voltage terminal 26 and the electrode lead 2c may be stably maintained by the applied elastic restoring force.

The cell terrace 2b may be pressed with its one surface contacting the press plate 10 and the other surface contacting the push bar pressing portion 34. That is, the push bar pressing portion 34 extends longer than the press plate 10 in the X-axis direction to compensate for a thickness difference between the cell body 2a and the cell terrace 2b, in order to press the cell terrace 2b.

The cell terrace 2b is the heat-sealed area of the pouch case of a laminate sheet material, and may be damaged when excessively pressed. However, the push bar pressing portion 34 of the present disclosure is connected to the push bar head 31, allowing elastic movement relative to the push bar head 31, thereby eliminating the likelihood that the cell terrace 2b may be damaged as described above.

In addition, since the cell terrace 2b is pressed by the push bar pressing portion 34 during charging and discharging, even if a large amount of gas is generated inside the secondary battery cell 2, swelling does not occur at the cell terrace 2b. Accordingly, it is possible to significantly reduce the insulation voltage defect rate caused by the breakage of the insulation layer of the pouch case due to the conventional swelling problem of the cell terrace 2b during charging and discharging.

Figure 11:
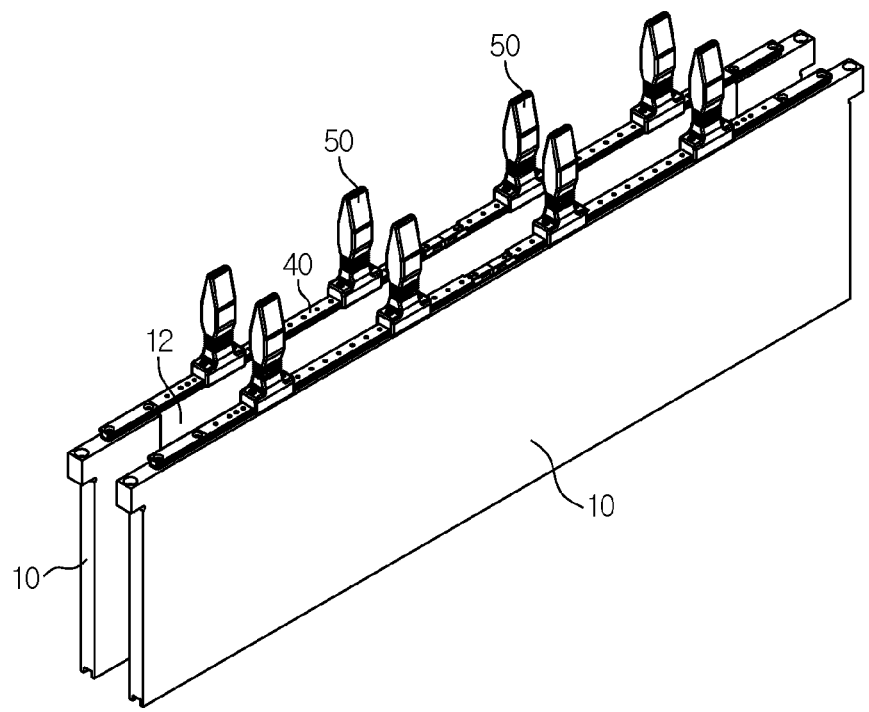
FIG. 11 is an assembled perspective view of a pair of press plates, a slip sheet, a slip sheet holder and a cell entry guide according to an embodiment of the present disclosure.
Figure 12:
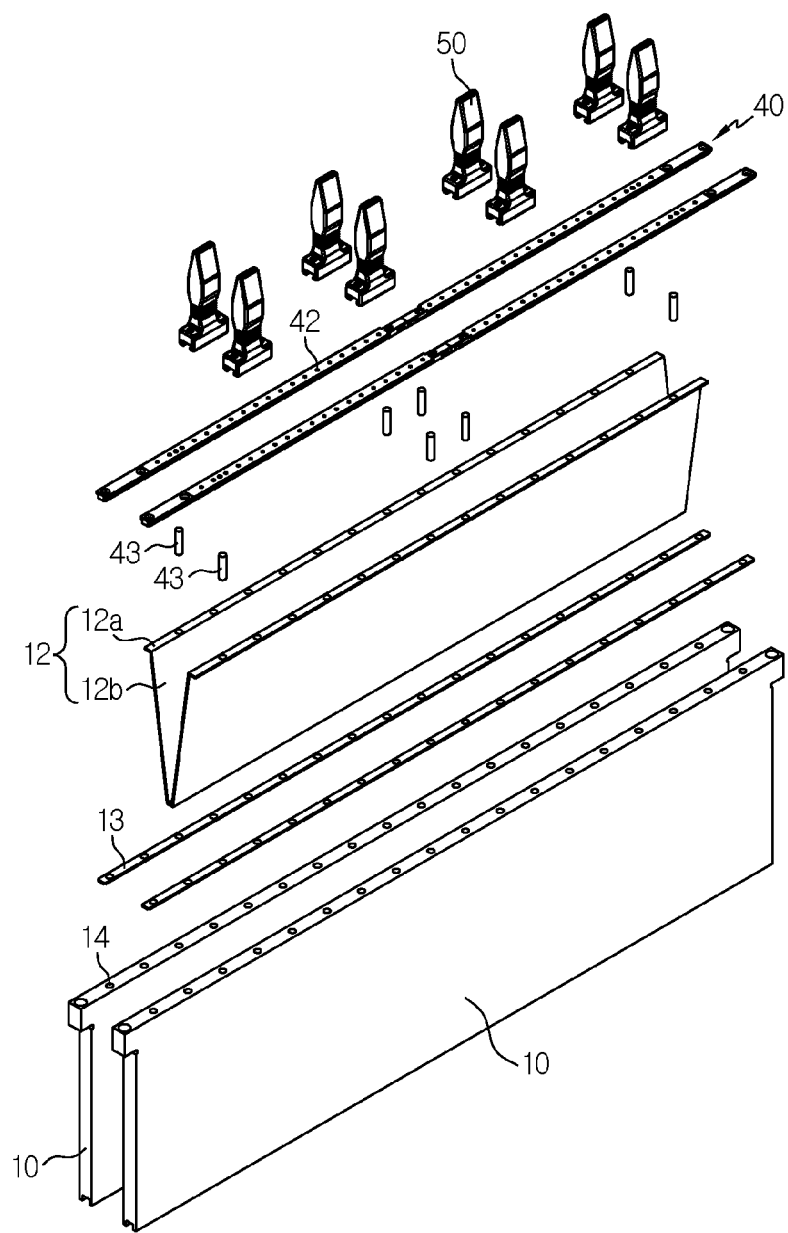
FIG. 12 is an exploded perspective view of FIG. 11.
Figure 13:
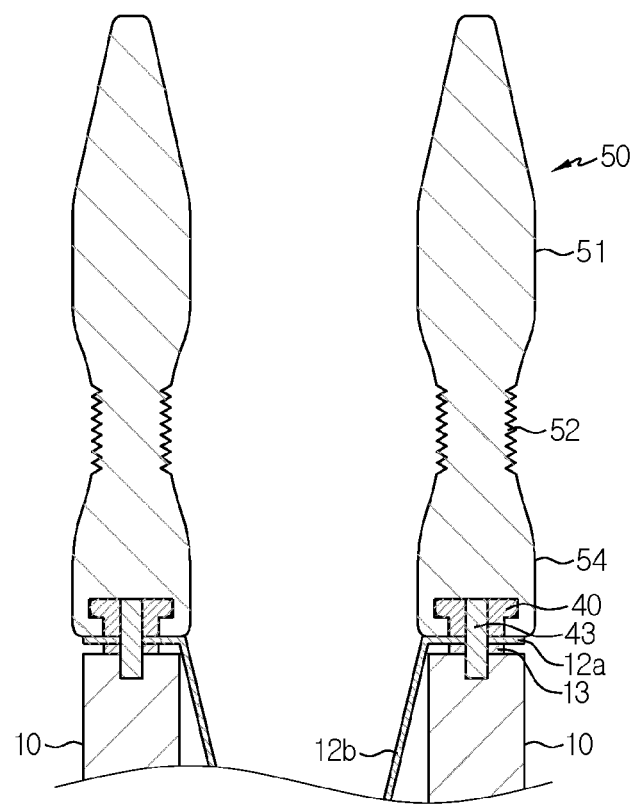
FIG. 13 is a schematic cross-sectional view of FIG. 11.

Referring to FIGS. 11 to 13 together with FIG. 2, the apparatus for charging and discharging a secondary battery according to an embodiment of the present disclosure may further include the slip sheet 12 that is disposed in the cell insertion space S to support the secondary battery cells 2, the slip sheet holder 40 that is attached to the top of the press plate 10 with a portion of the slip sheet 12 interposed between so that the portion of the slip sheet 12 is attached to the top of the press plate 10, and the cell entry guide 50 that is mounted on the slip sheet holder 40 and slidably moveable in the leftward and rightward direction.

The separator sheet 12 may include attaching portions 12a that are attached to the top of the press plates 10, and a folding portion 12b disposed in the cell insertion space S, where an area between the attaching portions 12a is folded.

For example, as shown in FIG. 12, the slip sheet 12 is formed by folding a rectangular sheet in half so that the folded part is disposed in the cell insertion space S and two edges are each attached to the top of two press plates 10. Each edge corresponds to the attaching portion 12a, and the region between the attaching portions 12a corresponds to the folding portion 12b.

Although this embodiment uses one slip sheet 12 per two press plates 10, in an alternative embodiment, one slip sheet 12 including at least two folding portions 12b and at least three attaching portions 12a by folding a rectangular sheet having a sufficiently large area many times may be applied to at least three press plates 10.

The slip sheet holder 40 may be disposed on the attaching portion 12a of the slip sheet 12 along the top line of the press plate 10 to cover the entire attaching portion 12a of the slip sheet 12. In addition, the slip sheet holder 40 may include separable unit slip sheet holders 40, each attached/detached to/from the top of the press plate 10.

For example, slip sheet fixing pins 43 vertically passing through the attaching portions 12a of the slip sheet 12 are coupled to fitting grooves 14 via interference fit one-to-one, the fitting grooves 14 being recessed on the top of the press plate 10, in order to attach the slip sheet holder 40 to the top of the press plate 10. In addition, a washer 13 may be disposed on top of the press plate 10 to prevent damage to the upper surface of the press plate 10 and improve the bond strength when mounting the slip sheet holder 40.

The slip sheet 12 is a consumable and needs to be replaced. According to the above-described configuration of the present disclosure, the slip sheet 12 may be installed in the press plate 10 in a simple manner of placing the attaching portions 12a of the slip sheet 12 on top of the slip sheet holder 40, fitting the slip sheet fixing pins 43 into the fitting grooves 14 and pressing the slip sheet holder 40, and the slip sheet holder 40 may be dissembled by simply lifting up the slip sheet holder 40, thereby significantly reducing the time required to replace and repair the slip sheet 12.

The cell entry guide 50 includes a guide shape portion 51 formed in a sloping or curved shape facing the insertion space, and at least one guide shape portion 51 may stand upright along the top line of each press plate 10. The cell entry guide 50 serves to guide the secondary battery cell 2 to accurately enter the cell insertion space S when placing the secondary battery cells 2 between the press plates 10.

As described above, the secondary battery cells 2 are placed between the press plates 10 downward from the top of the apparatus for charging and discharging a secondary battery by the pickup device (not shown). In this instance, according to the configuration of the cell entry guide 50, even if the secondary battery cells 2 are moved down slightly away from the right position, the secondary battery cells 2 may be guided into the right position along the guide shape portion 51. In this way, the cell entry guide 50 guides the secondary battery cells 2, thereby making the cell insertion process easier and preventing the secondary battery cell 2 from being damaged due to the contact with the top of the press plate 10 in the cell insertion process.

As shown in FIG. 11, in this embodiment, a total of four cell entry guides 50 are installed on the top of the press plate 10, and each two cell entry guides 50 are installed on each of two sides symmetrically with respect to the center of the cell body 2a, taking into account the length of the secondary battery cell 2 to be loaded. When the secondary battery cell 2 having a shorter length than this embodiment is loaded, the distance between the cell entry guides 50 may be narrower, or the number of cell entry guides 50 may be two or three.

Figure 14:
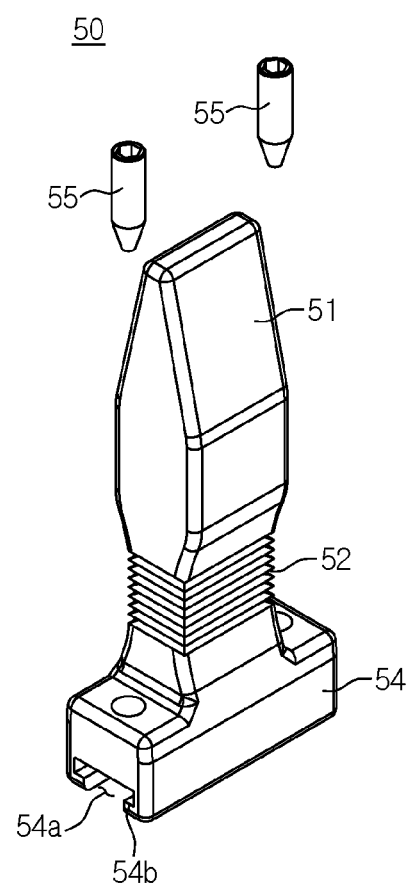
FIG. 14 is a perspective view of the cell entry guide of FIG. 11.

In particular, referring to FIGS. 14 and 15, the cell entry guide 50 according to this embodiment further includes an elastic support portion 52 to support the guide shape portion 51 with a spring or bellows structure below the guide shape portion 51, and a guide mounting portion 54 mounted on the slip sheet holder 40 and slidably moveable along the longitudinal direction of the slip sheet holder 40.

The elastic support portion 52 is a spring to bellows structure, and may be deformed by an external force and restored when the external force is removed. Since the guide shape portion 51 is supported by the elastic support portion 52, the guide shape portion 51 may be bent in the front and rear direction within a predetermined angle range. In this case, compared to the fixed guide shape portion 51, the range in which the secondary battery cell 2 is guided into the right position increases, thereby improving the cell insertion process efficiency. In addition, the elastic support portion 52 may act as an impact buffer at the time of collision between the cell entry guide 50 and the secondary battery cell 2 in the cell insertion process, thereby preventing the cell damage.

The guide mounting portion 54 may be provided below the elastic support portion 52 and may be mounted on the slip sheet holder 40 and slidably moveable in the leftward and rightward direction along the longitudinal direction of the slip sheet holder 40. For example, the guide mounting portion 54 may be formed with a similar structure to an LM block so that may be coupled slidably in the leftward and rightward direction along the top of the slip sheet holder 40 or the press plate 10.

Figure 15:
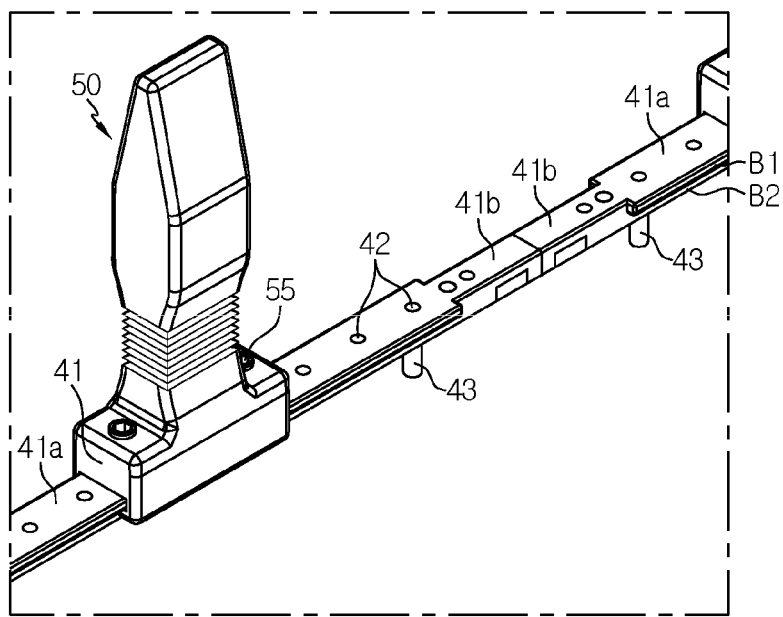
FIG. 15 is a diagram illustrating an assembly structure of the cell entry guide and the slip sheet holder of FIG. 11.

Specifically, referring to FIG. 15, the guide mounting portion 54 has a fitting hole 54a and a step 54b on the lower side and may be fitted into the slip sheet holder 40.

The slip sheet holder 40 includes a guide movement section 41a and a guide installation section 41b. The guide movement section 41a is provided such that an upper body B1 has a larger width than a lower body B2. The guide mounting portion 54 wraps around the upper body B1 of the guide movement section 41a, and the step 54b is fitted into the bottom of the upper body B1 to prevent separation from the guide movement section 41a.

The slip sheet holder 40 may be divided into two unit slip sheet holders 40. The guide installation section 41b has the same width as the lower body B2 of the guide movement section 41a, so that the guide mounting portion 54 may be vertically inserted through the guide installation section 41b. As described above, the cell entry guide 50 may be inserted into the guide installation section 41b, and positioned in the guide movement section 41a by sliding movement in the leftward and rightward direction.

In addition, the guide mounting portion 54 slidably moves along the upper surface of the slip sheet holder 40, and may further include a ball plunger 55 that is inserted into any one of positioning grooves 42 recessed at each predetermined position on the upper surface of the slip sheet holder 40.

The ball plunger 55 may be coupled perpendicularly to the top of the guide mounting portion 54 such that the ball portion is disposed in the fitting hole 54a. Each ball plunger 55 may be provided on each of two sides of the guide shape portion 51.

According to the configuration of the ball plunger 55 and the positioning grooves 42 provided on the upper surface of the slip sheet holder 40, it is possible to reduce friction when the cell entry guide 50 slidably moves in the leftward and rightward direction, leading to smooth movement, make it easy to adjust the spacing between the cell entry guides 50, and make sure that the cell entry guide 50 is fixed at a specified position.

Figure 16:
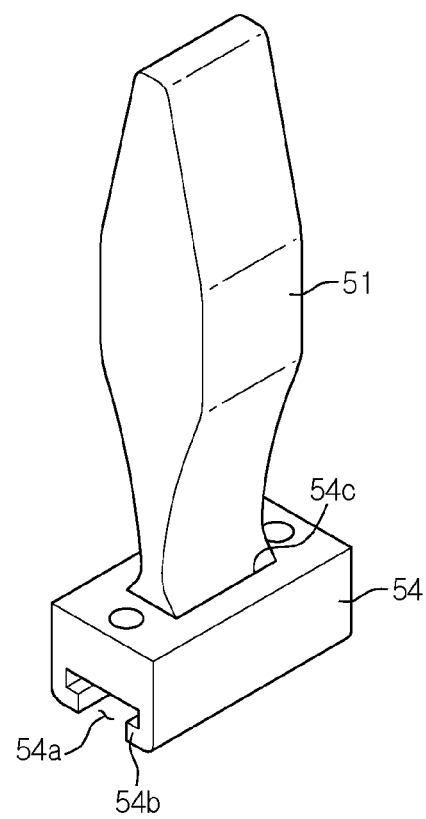
FIG. 16 is a perspective view of a cell entry guide according to a variation to FIG. 11.
Figure 17:
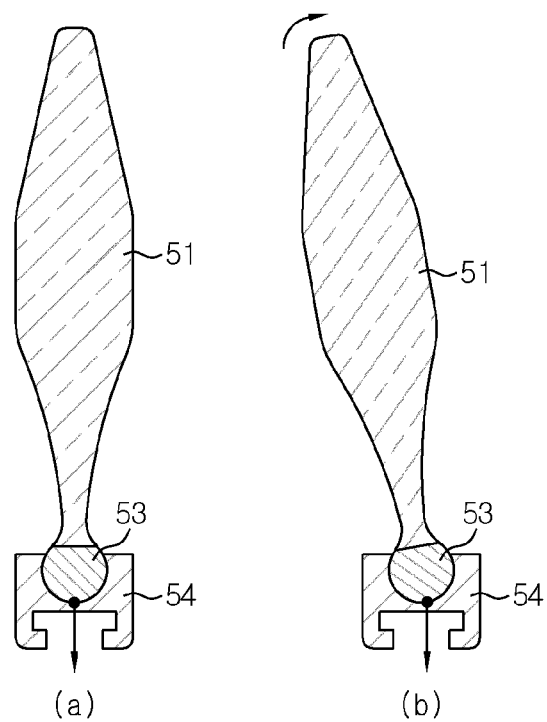
FIG. 17 is a diagram illustrating an example of operation of the cell entry guide of FIG. 16.

FIG. 16 is a perspective view of the cell entry guide 50 according to a variation to FIG. 11, and FIG. 17 is a diagram illustrating an example of operation of the cell entry guide 50 of FIG. 16.

Subsequently, a variation of the cell entry guide 50 will be described with reference to FIGS. 16 and 17.

The same reference number denotes the same element, and to avoid redundancy, the following description is made based on differences from the above-described cell entry guide 50.

A cell entry guide 50A according to this variation includes a balance portion 53 that acts as the center of mass below the guide shape portion 51 to make a restoring motion and has a curved lower surface, and a guide mounting portion 54 coupled with the balance part 53 to allow the balance portion 53 to rotate within a predetermined angle range.

The balance portion 53 may have a spherical, cylindrical, arch-shaped lower surface that is in contact with the bottom to allow rotation, and may be made of a different type of material having a greater specific gravity than the guide shape portion 51 or filled with a different type of material.

The guide mounting portion 54 is in the shape of an LM block, and may include a fitting hole 54*a* and a step 54*b* at the lower end to slidably move along the slip sheet holder 40 in the same way as the above-described embodiment, and as opposed to the above-described embodiment, the guide mounting portion 54 further includes an inner receiving groove around the balance portion 53. The balance portion 53 may rotate at a predetermined angle within the inner receiving groove 54*c*.

As shown in FIG. 17, the center of mass of the cell entry guide 50A according to the variation is located at the bottom center of the balance portion 53. Accordingly, even if the guide shape portion 51 is pushed by any external factor, the cell entry guide 50A stands upright again due to the gravity acting on the center of mass.

According to the configuration of the cell entry guide 50A according to this variation, it is easy to identify an error in descending position of the secondary battery cells 2, thereby improving the efficiency of the cell insertion process.

In addition, when there is no error in descending position of the secondary battery cells 2, the secondary battery cells 2 will enter the space between the press plates 10 directly without the help of the cell entry guide 50A, and when there is an error in descending position, the cell entry guide 50A is tilted due to the contact between the secondary battery cells 2 and the cell entry guide 50A. The operator sees that the cell entry guide 50A is tilted, stops lifting down the secondary battery cells 2 and appropriately corrects the descending position to accurately insert them into the space between the press plates 10, thereby improving the efficiency of the cell insertion process and preventing cell damage in the cell insertion process.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Meanwhile, the terms indicating directions as used herein such as upper, lower, left and right are used for convenience of description only, and it is obvious to those skilled in the art that the term may change depending on the position of the stated element or an observer.

What is claimed is:

1. An apparatus for charging and discharging a secondary battery cell, the apparatus comprising:
   a plurality of press plates arranged opposite each other with a cell insertion space interposed therebetween into which the secondary battery cell is insertable, and the plurality of press plates being movable towards each other to press a body of the secondary battery cell;
   at least one gripper unit mounted on an upper edge of each press plate of the plurality of press plates, the at least one gripper unit extending into the cell insertion space, and the at least one gripper unit configured to come into direct contact with an electrode lead of the secondary battery cell when adjacent press plates press the body of the secondary battery cell; and
   at least one push bar unit coupled with the at least one gripper unit, the at least one push bar unit extending into the cell insertion space and including a push bar pressing portion configured to elastically press a terrace area of the secondary battery cell.

2. The apparatus according to claim 1, wherein the at least one push bar unit further includes a push bar head disposed on top of the press plate, and
   wherein the push bar pressing portion is provided in a plate shape having a width corresponding to a width of the terrace area of the secondary battery and extending to the cell insertion space on one side of the push bar head.

3. The apparatus according to claim 2, wherein the push bar head has a step on one side, and
   wherein the push bar pressing portion is connected to the one side of the push bar head to allow elastic movement of the push bar pressing portion within a depth of the step.

4. The apparatus according to claim 2, wherein the push bar pressing portion has a mounting hole formed in a thickness direction at an upper end of the push bar,
   wherein the push bar pressing portion is connected to the push bar head by a fastening member, the fastening member including a first part that is located inside the mounting hole, a second part that has a smaller diameter than the first part, the second part passing through the mounting hole, and a third part that has a smaller diameter than the second part and is screwed to one side of the push bar head, and
   wherein a spring surrounds the second part.

5. The apparatus according to claim 3, wherein the at least one push bar unit further includes a silicone pad attached to a surface of the push bar pressing portion.

6. The apparatus according to claim 1, further comprising:
   a slip sheet having at least a portion disposed in the cell insertion space and configured to support the secondary battery cell; and
   a slip sheet holder that is configured to be attached and detached to/from a top of each of the adjacent press plates with the slip sheet interposed between the slip sheet holder and the adjacent press plates.

7. The apparatus according to claim 6, further comprising:
   at least one cell entry guide extending upright along the slip sheet holder and including a guide shape portion having a sloping or curved shape facing the cell insertion space.

8. The apparatus according to claim 7, wherein the cell entry guide further includes an elastic support portion to support the guide shape portion, the elastic support portion being a spring or bellows structure below the guide shape portion.

9. The apparatus according to claim 8, wherein the cell entry guide further includes a guide mounting portion provided below the elastic support portion, and the guide mounting portion is mounted on the slip sheet holder and is slidably moveable along a longitudinal direction of the slip sheet holder.

10. The apparatus according to claim 9, wherein the slip sheet holder has positioning grooves that are recessed at predetermined positions on an upper surface of the slip sheet holder along the longitudinal direction, and
    wherein the guide mounting portion has a ball plunger, the ball plunger being fitted into any one of the positioning grooves.

11. The apparatus according to claim 7, wherein the cell entry guide further includes:
    a balance portion configured to define a center of mass below the guide shape portion, and the balance portion has a curved lower surface; and
    a guide mounting portion that receives the balance portion, and the guide mounting portion has an inner receiving groove configured to allow the balance portion to rotate within a predetermined range.

* * * * *